United States Patent
Nong

(10) Patent No.: US 7,206,325 B2
(45) Date of Patent: Apr. 17, 2007

(54) FRAME ASSEMBLY CIRCUIT FOR USE IN A SCALABLE SHARED QUEUING SWITCH AND METHOD OF OPERATION

(75) Inventor: Ge Nong, Hong Kong (CN)

(73) Assignee: STMicroelectronics Ltd., Hong Kong (HK)

( * ) Notice: Subject to any disclaimer, the term of this patent is extended or adjusted under 35 U.S.C. 154(b) by 961 days.

(21) Appl. No.: 10/141,560

(22) Filed: May 8, 2002

(65) Prior Publication Data
US 2003/0210687 A1 Nov. 13, 2003

(51) Int. Cl.
*H04J 3/16* (2006.01)
(52) U.S. Cl. .................. 370/474; 370/465; 370/476
(58) Field of Classification Search ............ None
See application file for complete search history.

(56) References Cited

U.S. PATENT DOCUMENTS

| | | | | |
|---|---|---|---|---|
| 6,055,235 A * | 4/2000 | Blanc et al. | ........... | 370/389 |
| 6,661,786 B1 * | 12/2003 | Abbiate et al. | ........... | 370/386 |
| 6,680,939 B1 * | 1/2004 | Lydon et al. | ........... | 370/366 |
| 6,728,251 B1 * | 4/2004 | Blanc et al. | ........... | 370/395.7 |
| 6,877,048 B2 * | 4/2005 | Bilak et al. | ........... | 710/52 |
| 7,023,841 B2 * | 4/2006 | Dell et al. | ........... | 370/388 |
| 2002/0085578 A1 * | 7/2002 | Dell et al. | ........... | 370/422 |
| 2003/0076832 A1 * | 4/2003 | Ni | ........... | 370/395.1 |

OTHER PUBLICATIONS

Weller, T., et al.: "Scheduling Nonuniform Traffic in a Packet Switching System with Small Propagation Delay"; pp. 0-30.
Keslassy. I.. et al.: "Maintaining Order In Two-Stage Switches"; Computer Systems Laboratory. Stanford University.

* cited by examiner

*Primary Examiner*—Phirin Sam
(74) *Attorney, Agent, or Firm*—Lisa K. Jorgenson; William A. Munck

(57) ABSTRACT

A packet switch capable of receiving fixed size data cells from N input ports and transmitting the fixed size data cells to N output ports. The packet switch comprises: 1) a frame deserializer for receiving the data cells as serial bits from the N input ports and transmitting the data cells as parallel bits in data frames containing a plurality of data cells, wherein each of the plurality of data cells in each data frame are destined for a common output port; 2) a frame serializer for receiving the data frames and transmitting the plurality of data cells in the data frames as serial bits to the N output ports; and 3) a shared buffer coupling the frame deserializer and the frame serializer for receiving and buffering the data frames from the frame deserializer and transmitting the buffered data frames to the frame serializer.

31 Claims, 3 Drawing Sheets

FRAME ASSEMBLY CIRCUIT FOR USE IN A SCALABLE SHARED QUEUING SWITCH AND METHOD OF OPERATION

TECHNICAL FIELD OF THE INVENTION

The present invention is generally directed to packet switching networks and, more specifically, to a switch having a frame assembly circuit that minimizes the mean frame assembly delay time.

BACKGROUND OF THE INVENTION

Packet switching involves the transmission of data in packets through a data network. Fixed sized packets are referred to as cells. Each block of end-user data that is to be transmitted is divided into cells. A unique identifier, a sequence number and a destination address are attached to each cell. The cells are independent and may traverse the data network by different routes. The cells may incur different levels of propagation delay, or latency, caused by physical paths of different lengths. The cells may be held for varying amounts of delay time in buffers in intermediate switches in the network. The cells also may be switched through different numbers of packet switches as the cells traverse the network, and the switches may have unequal processing delays caused by error detection and correction.

If switch throughput demand is not high, shared queuing (SQ) switches are well known for being a cost-effective and efficient way of providing the buffering function for sustaining temporary egress (output) port congestion caused by simultaneously arriving traffic addressing a common egress port. Without loss of generality, FIG. 2 illustrates conventional N×N shared queuing (SQ) switch 200, which implements a typical architecture according to an exemplary embodiment of the prior art. Shared queuing switch 200 comprises N input ports, N output ports, frame deserializer (FD) 205, shared buffer 210, and frame serializer (FS) 215. Timing in shared queuing switch 200 is synchronized over time slots and data packets going through shared queuing switch 200 are encapsulated as fixed size cells.

FIG. 3 illustrates conventional fixed size cell 300 for use in N×N shared queuing switch 200. Cell 300 comprises two fields: cell header 305, which carries control information, and cell payload 310, which carries end-user data. The least significant bit (LSB) of cell 300 is transmitted first and begins header 305. The most significant bit (MSB) of cell 300 is transmitted last and ends payload 310. The destination output port of cell 300 is encoded in cell header 305. Roughly speaking, the task of shared queuing switch 200 is to transfer an incoming cell to its destination output port as fast as possible.

Without loss of generality, each input/output port is assumed to have an external link rate of one cell per time slot. Moreover, shared buffer 210 is assumed to have a bus width equal to the width of cell 300, so that each cell 300 can be stored or read as a whole unit by a single buffer access. Each incoming cell 300 arrives serially at shared queuing switch 200 via the external link of an input port. Frame deserializer 205 deserializes each serially arriving cell 300 into the bus width of shared buffer 210. Once arriving cell 300 is completely deserialized, it is forwarded in parallel from frame deserializer 205 to shared buffer 210. Shared buffer 210 is capable of writing N cells and reading N cells in a single time slot. Each cell 300 read from shared buffer 210 is immediately forwarded in a whole unit to frame serializer 215, where cell 300 is transmitted serially to the corresponding destination output port.

From a theoretical point of view, the architecture of shared queuing switch 200 is ideal in the sense that it is the most cost-effective and achieves the best performances in terms of cell throughput, mean cell delay, and other important parameters. The achievable maximum throughput of shared queuing switch 200 is limited by the bandwidth of shared buffer 210. To avoid frequent cell losses, shared buffer 210 is generally required to have a large storage capacity. As a result, random access memory (RAM) chips are commonly used in the shared buffer of a shared queuing switch.

Generally, there are two ways to increase the bandwidth of shared buffer 210: 1) speeding up the access rate of buffer 210, or 2) enlarging the bus width of buffer 210 for each single access. The access times of modern RAM chips are so low that little room is left for further improvement. In other words, for a given bus width, it is difficult for even state-of-the-art semiconductor technologies to dramatically improve the bandwidth of a RAM chip. This constitutes a bottleneck for using the first method to scale up the throughput of a shared queuing switch. As a result, the second method, enlarging the bus width seems to be the best choice for boosting the throughput of a shared queuing switch (i.e., to enlarge the cell size and at the same time, increase the bus width of the shared buffer accordingly).

For example, with respect to the shared queuing switch in FIG. 2, if the cell size is doubled, an N×N shared queuing switch with double the throughput can be constructed as shown in FIG. 4. FIG. 4 illustrates conventional N×N shared queuing switch 400 with two shared buffer banks according to one embodiment of the prior art. Shared queuing switch 400 comprises N input ports, N output ports, frame deserializer (FD) 405, shared buffer 410, and frame serializer (FS) 415. Shared buffer 410 comprises two buffer banks, namely shared bank 411 and shared bank 412, each with a bandwidth equal to shared buffer 210 in N×N shared queuing switch 200 shown in FIG. 2. However, scaling the throughput of a shared queuing switch by enlarging the cell size has two inherent drawbacks: 1) enlarging cell size causes a greater delay in encapsulating data into the larger cells; and (2) larger cell sizes coarsens the granularity of service provided to data traffic.

Without considering the delay for a cell going through, principally, a shared queuing switch with 100% throughput can be scaled up to any size. However, the mean cell delay increases when the frame size is increased, which imposes a limit on scaling up the throughput of a switch supporting delay sensitive applications.

Proposals have been made to assemble cells into frames in such a way that a frame contains only cells on the same channel, where a channel is the switching path between a pair of input and output ports. However, the result has been that the mean frame assembly delay for a N×N shared queuing switch is upper bounded by $O(N^2)$ time slots. This upper bound is not scalable, since it increases the frame assembly delay quadratically while the switch size grows.

Therefore, there is a need in the art for improved fixed-sized packet switches. In particular, there is a need for a highly scalable switch architecture in which frame assembly is performed with a practice-acceptable delay.

SUMMARY OF THE INVENTION

The present invention provides a scheme that maintains the minimum delay for encapsulating data into frames while also maintaining the FIFO order for cells on the same channel, where a channel is the switching path between an input port and output port pair. By relaxing the constraint that all cells assembled into a frame must be on the same channel, the present invention allow cells from different channels to be assembled into a frame. In particular, all cells in a frame are destined for the same output port, but these cells can come from various input ports. For an N×N shared queuing switch, assembling a frame from arriving cells in this manner has an upper bound of O(N) time slots for the mean frame assembly delay, which is far less than the $O(N^2)$ time slots for the prior art.

A scheme is presented herein to scale the throughput of a shared queuing switch. This scheme assembles large frames from small cells to facilitate the building of a high bandwidth shared buffer with a number of small ones. The key aspect of the present invention is-a novel frame assembly scheme that minimizes the mean frame assembly delay.

To address the above-discussed deficiencies of the prior art, it is a primary object of the present invention to provide a packet switch capable of receiving fixed size data cells from N input ports and transmitting the fixed size data cells to N output ports. According to an advantageous embodiment of the present invention, the packet switch comprises: 1) a frame deserializer capable of receiving the data cells as serial bits from the N input ports and transmitting the data cells as parallel bits in data frames containing a plurality of data cells, wherein each of the plurality of data cells in each data frame are destined for a common output port; 2) a frame serializer capable of receiving the data frames and transmitting the plurality of data cells in the data frames as serial bits to the N output ports; and 3) a shared buffer coupling the frame deserializer and the frame serializer capable of receiving and buffering the data frames from the frame deserializer and transmitting the buffered data frames to the frame serializer.

According to one embodiment of the present invention, each data frame contains up to N data cells.

According to another embodiment of the present invention, the frame deserializer transmits to the shared buffer fully filled data frames containing N data cells prior to transmitting partially filled data frames containing less than N data cells.

According to still another embodiment of the present invention, the frame deserializer first transmits to the shared buffer a first fully filled data frame having a highest priority among all fully filled data frames.

According to yet another embodiment of the present invention, a priority of each of the fully filled data frames is determined by a priority of the common output port associated with each of the fully filled data frames.

According to a further embodiment of the present invention, a priority of a first common output port to which the first fully filled data frame is transmitted is updated after the first fully filled data frame has been transmitted.

According to a still further embodiment of the present invention, the frame deserializer first transmits to the shared buffer a first partially filled data frame having a highest priority among all partially filled data frames.

According to yet further embodiment of the present invention, a priority of each of the partially filled data frames is determined by a priority of the common output port associated with each of the partially filled data frames.

According to a further embodiment of the present invention, a priority of a first common output port to which the first partially filled data frame is transmitted is updated after the first partially filled data frame has been transmitted.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed herein, and the various embodiments used to describe the principles of the present invention in this patent document are by way of illustration only and should not be construed in any way so as to limit the scope of the invention. Those skilled in the art will understand that the principles of the present invention may be implemented in any suitably arranged scalable shared queuing packet data switches.

Figure 1:
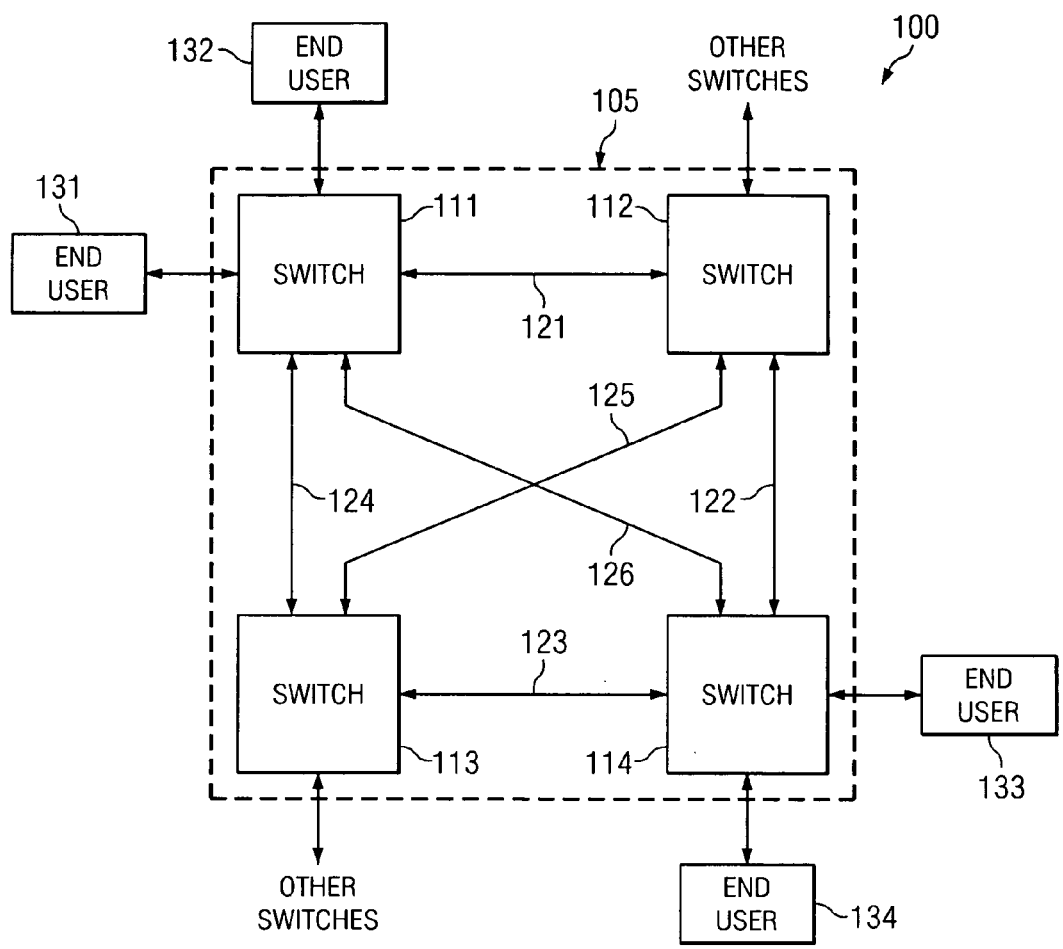
FIG. 1 illustrates an exemplary packet switching network containing scalable shared queuing switches in accordance with the principles of the present invention.
Figure 2:
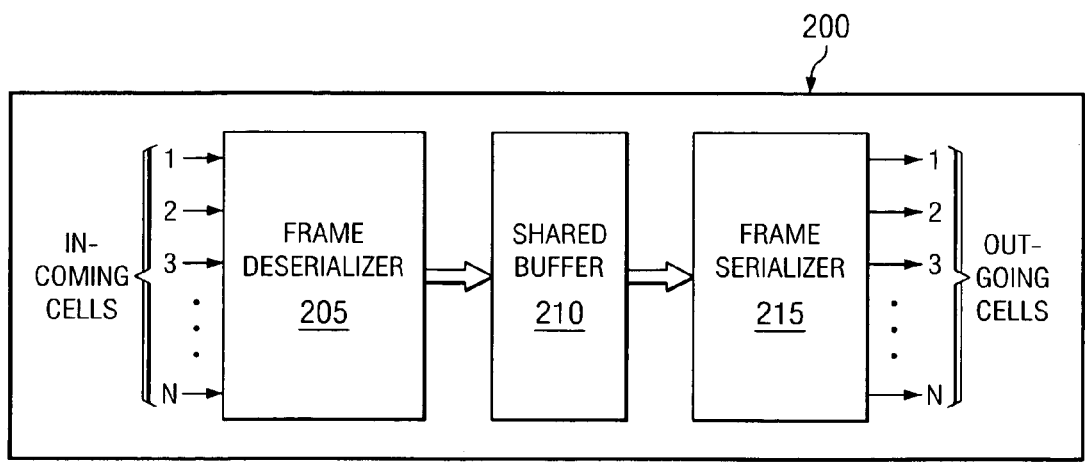
FIG. 2 illustrates a conventional N×N shared queuing switch according to one embodiment of the prior art.
Figure 3:
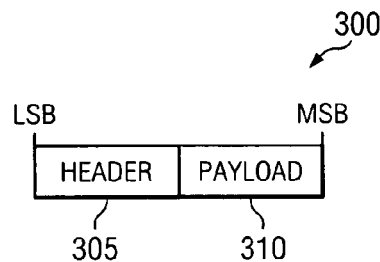
FIG. 3 illustrates a conventional fixed size cell for use in a N×N shared queuing switch according to principles of the present invention.
Figure 4:
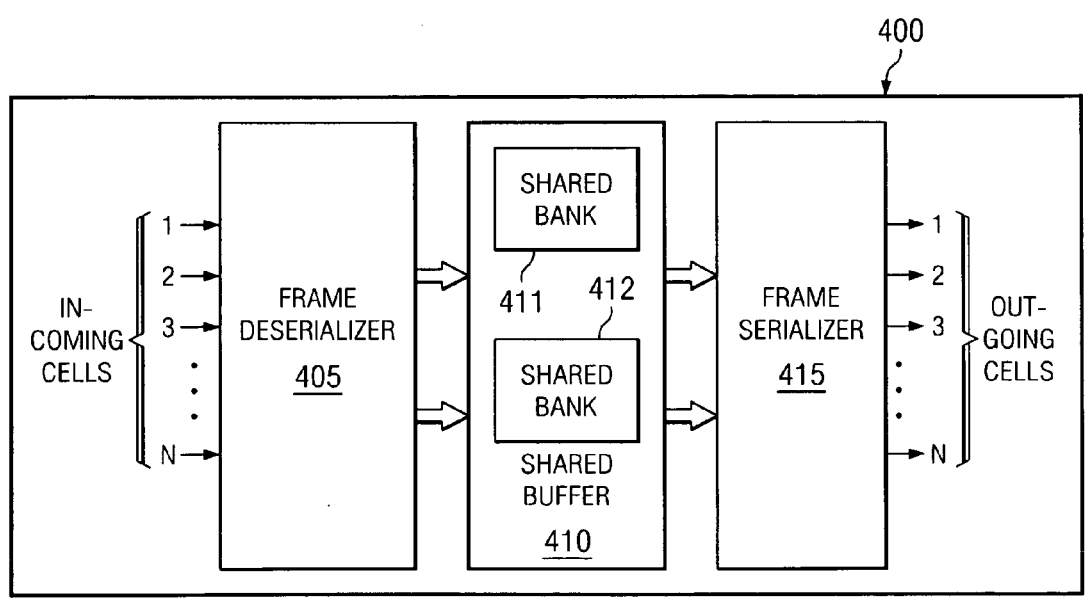
FIG. 4 illustrates a conventional N×N shared queuing switch with two shared buffer banks according to one embodiment of the prior art.

FIG. 1 illustrates an exemplary packet switching network 100 containing packet switches 111–114 in accordance with the principles of the present invention. Packet switching network 100 contains a subnetwork 105, indicated by a dotted line, comprising packet switches 111–114, that interconnects end-user devices 131–134 with each other and with other switches (not shown) and other end-user devices (not shown) associated with packet switching network 100. Packet switches 111–114 are interconnected by data links 121–126. Subnetwork 105 is intended to be a representative portion of packet switching network 100, which may contain many other redundant packet switches similar to packet switches 111–114.

End-user devices 131–134 each may comprise any commonly known processing device, such as a telephone, a personal computer (PC), a fax machine, an office LAN, a network server, or the like, that may communicate via a packet switching network. For example, end-user 131 may comprise a remote network server that is sending a data file to end-user 133, which is a desktop PC. The data file that is to be transmitted is segmented into fixed-size data packets (or cells) in end-user 131. An identifier for the data transfer is appended to each data cell. A sequence number is also appended to each data cell, as is a destination address associated with end-user 133.

Next, the data cells are transferred to packet switch 111. Packet switch 111 may transfer the data cells to end-user 133 by several physical paths. For example, packet switch 111 may send the data cells directly to packet switch 114 across data link 126. If the data traffic load on data link 126 is heavy, packet is switch 111 may send some or all of the data cells indirectly to packet switch 114 via data link 121, packet switch 112, and data link 122. Alternatively, packet switch 111 may send some or all of the data cells indirectly to packet switch 114 via data link 124, packet switch 113, and data link 123. Packet switch 114 transfers the data cells to end user device 133, which uses the identifier information and the sequence numbers from each data cell to reassemble the original data file sent by end-user device 131.

Figure 5:
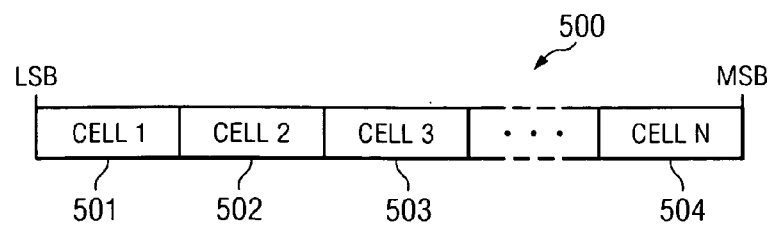
FIG. 5 illustrates a data frame comprising N cells for use in an N×N shared queuing switch according to principles of the present invention.

According to an exemplary embodiment of the present invention, one or more packet switches is an N×N shared queuing switch, including, for example, packet switch 111. The fixed size data packets (or cells) are assembled into frames for transmission from the input ports to the output ports of the packet switch. FIG. 5 illustrates data frame 500 comprising N cells for use in N×N shared queuing switch 111 according to principles of the present invention. The N cells of data frame 500 include exemplary cells 501, 502, 503, and 504, which are labeled Cell 1, Cell 2, Cell 3, and Cell N, respectively. The least significant bit (LSB) of data frame 500 is transmitted first and begins cell 501. The most significant bit (MSB) of data frame 500 is transmitted last and ends cell 504.

Figure 6:
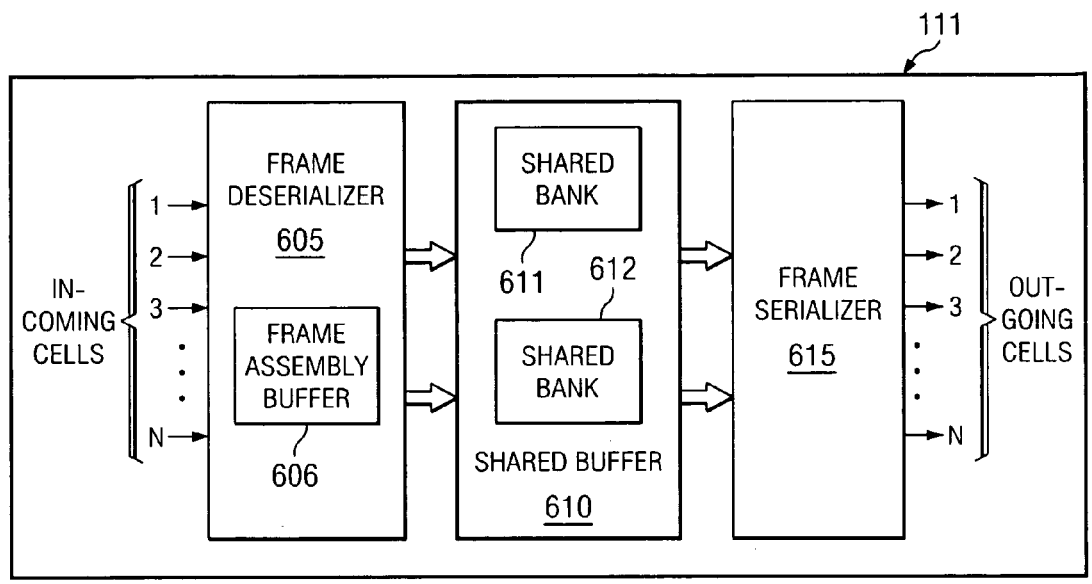
FIG. 6 illustrates a N×N shared queuing switch with two shared buffer banks and a frame assembly buffer according to one embodiment of the present invention.

FIG. 6 illustrates N×N shared queuing switch 111 with two shared buffer banks and a frame assembly buffer according to one embodiment of the present invention. Shared queuing switch 111 comprises N input ports, N output ports, frame deserializer (FD) 605, frame assembly buffer 606, shared buffer 610, shared bank 611, shared bank 612, and frame serializer (FS) 615. Timing in shared queuing switch 111 is synchronized over time slots. Shared buffer 610 provides the major buffer storage for shared queuing switch 111. Shared buffer 610 is capable of writing a frame and reading a frame per time slot. Shared buffer 610 may be, for example, an internally buffered crossbar. Frame assembly buffer 606 is the buffer storage used in frame deserializer 605 for queuing frames before the frames can be forwarded to shared buffer 610. Frame assembly buffer 606 is capable of writing N cells per time slot and reading an N-cell frame per time slot.

It is assumed herein that frame serializer (FS) 615 serializes each frame to its destination output port from the least to the highest significant bits of data frame 500. Cells arriving at switch 111 are assembled into frames by frame deserializer (FD) 605 in such a way as to satisfy the following conditions: (1) all cells of data frame 500 must be destined for the same output port; (2) the cells of data frame 500 may arrive at switch 111 from different input ports; and (3) within data frame 500, the relative sequence is order between any two cells 300 on the same channel must be maintained from the least significant bit (LSB) to the most significant bit (MSB) of data frame 500.

To assemble frames by the above method, frame assembly buffer 606 may use an N×N shared queuing switch with a capacity of $N^2$ cells. With respect to forwarding data frame 500 from frame deserializer 605 to the shared buffer 610, two situations should be considered:

1) Situation 1—Each input port of the switch is fully loaded. In this case, frame deserializer 605 is able to assemble frames in a constant rate of one fully filled data frame per time slot. At each frame forwarding decision point, frame deserializer 605 simply selects a fully filled frame, with first-in, first-out (FIFO) order being maintained among frames destined for the same output port. Provided that no output is overloaded, a maximum throughput of 100% is guaranteed independent of the switch size and traffic pattern.

2) Situation 2—There is at least one input port that is not fully loaded. Since fully filled frames will not be generated at a constant rate, the forwarding of partially filled frames must be considered. Otherwise, a cell may experience an unnecessarily long delay at the frame assembling stage. Since an output port receives cells destined for it on a frame-by-frame basis, the empty slots of a partially data frame 500 waste parts of the raw bandwidth of the output port, leading to a reduced effective bandwidth.

The following is an algorithm, expressed as a pseudo C programming language, describing how frame deserializer 605 forward data frame 500 queuing in frame assembly buffer 606 to shared buffer 610 in each time slot:

```
IF (there is at least a fully filled frame) {
  Forward the data frame with the highest priority destina-
     tion output port among all fully filled frames;
  Update the priority of the destination output port of the
     forwarded frame on the fully filled frame level;
}
ELSE {
```

Forward the data frame with the highest priority destination output port among all partially filled frames that have no queuing frame at the shared frame buffer destined for the same output ports;

Update the priority of the destination output port of the forwarded frame on the partially filled frame level;
}

In the above algorithm, frame deserializer 605 schedules the transmission of queued data frames 500, including both fully-filled and partially-filled frames, on a hierarchy having two levels: fully filled over partially filled ones. Accordingly, each output port is allocated two variables for recording priorities, one variable for the fully filled frame level and another variable for the partially filled frame level.

Shared buffer 610 maintains N FIFO queues for queuing frames (i.e., one queue per output port). For each time slot, if shared buffer 610 is non-empty, a data frame 500 is selected among all queuing data frames and forwarded to frame serializer 615. In particular, it can be done as described below:

Forward the highest priority frame among the head-of-line frames of all queues to the frame serializer;

Update the priority of the queue of the forwarded frame as the lowest;

So far, it has been assumed that an N×N shared buffer have been used as frame assembly buffer 606 in frame deserializer 605. This N×N shared buffer is required to be capable of randomly accessing 2N cells at each time slot (i.e., writing N cells and reading N cells). When N is large, building such a shared buffer with a capacity of $N^2$ cells is difficult. Therefore, instead of using an N×N shared buffer, an exemplary embodiment of the present invention provides a scalable architecture for frame assembly buffer 606.

Figure 7:
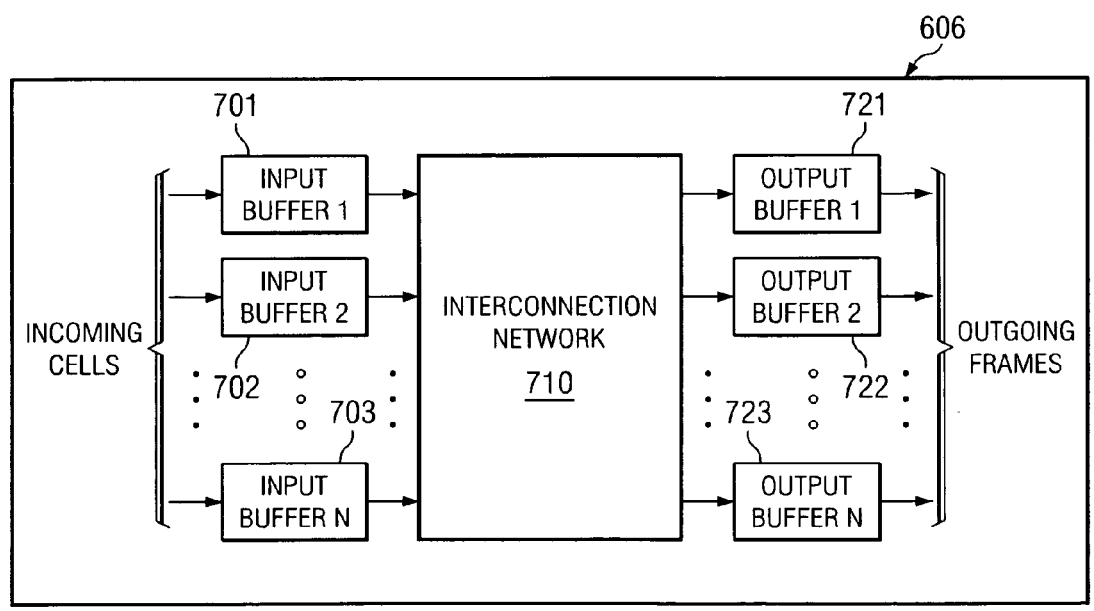
FIG. 7 illustrates in greater detail a frame assembly buffer for use in an N×N shared queuing switch according to one embodiment of the present invention.

FIG. 7 illustrates in greater detail frame assembly buffer (FAB) 606 for use in N×N shared queuing switch 111 according to one embodiment of the present invention. Frame assembly buffer 606 comprises N input buffers, including exemplary input buffers 701, 702, and 703, labeled Input Buffer 1, Input Buffer 2, and Input Buffer N, respectively. Frame assembly buffer 606 also comprises interconnection network 710 and N output buffers, including exemplary output buffers 721, 722, and 723, labeled Output Buffer 1, Output Buffer 2, and Output Buffer N, respectively.

As shown in FIG. 7, frame assembly buffer 606 has a scalable architecture. Frame assembly buffer 606 is an N×N combined input and output queuing (CIOQ) switch in which N input and N output buffers are interconnected by interconnection network 710, which can be configured dynamically (e.g., a crossbar). Specifically, each input buffer and output buffer has a capacity of KN cells, where K is a constant of not less than one. Furthermore, queuing of cells at each input buffer 701 is organized as virtual output queuing (VOQ)(i.e., one queue per destination output buffer).

Given this CIOQ architecture for frame assembly buffer 606, assembling frames from incoming cells consists of two sub-tasks: 1) routing cells arriving at input buffers; and (2) switching queuing cells from input to output buffers.

Cell Routing—To determine which output buffer of the CIOQ that a cell arriving at an input buffer is destined for, it is possible to track the frame departure process in case that an N×N shared frame assembly buffer is used as frame assembly buffer 606. Each arriving cell is assigned its destination output buffer as its slot index (starting from one) of this cell at the frame containing it in the N×N shared frame assembly buffer.

Cell Switching—At each time slot, according to the queuing status of each input buffer, a set of cells queuing at input buffers are selected and switched to their destination output buffers via the paths set up by interconnection network 710. To guarantee that a data frame 500 must have been available at an output buffer by which it should leave the tracked N×N shared frame assembly buffer, the present invention may: 1) select queuing cells by a maximal matching algorithm and use an internal speed-up of two; or 2) select queuing cells by a maximum matching algorithm without internal speed-up.

The principles of scalable frame deserializer 605 may be better understood by the following example:

1) The CIOQ frame assembly buffer 606 of frame deserializer 605 operates in a store-and-forward manner from frame to frame. Specifically, frame assembly buffer 606 may operate as follows:

a) At frame F, cells arriving at each input buffer are queued.

b) At frame F+1, cells currently queuing at input buffers that arrived in Frame F are switched to the assigned destined output buffers.

2) For each switching, a set of cells making up a maximal matching are chosen.

3) An internal speed-up of two is used (i.e., two switching operations per time slot).

4) At a rate of one data frame 500 per time slot, queuing frames at output buffers are forwarded to shared buffer 610 with the same order maintained as when the frames leave the shared frame assembly buffer.

The present invention provides some distinct advantages over the prior art, including:

1) Optimal delay-throughput performance whereby 100% throughput and small mean frame assembly delay are achieved.

2) Regular hardware structure of the switch fabric and interconnecting network. Each switching fabric is a commutator with highly regular hardware structures and controls. The rotating property of such switching fabric can minimize the tuning distance of a WDM optical wavelength tuner if some kind of optical wavelength switching technique is employed to implement the switching fabric.

3) The size of the scalable CIOQ frame assembly buffer 606 is small. Only a total of $4(N^2)$ cells are required.

4) Shared buffer 610 uses no internal speed-up and is shared by data frames 500 destined for all output ports, resulting in the highest utilization efficiency.

5) The switch scalability is good, since the achievable throughput is not affected by the switch size and the mean cell delay is in the same order of N time slots as in the ideal N×N OQ switch.

Although the present invention has been described in detail, those skilled in the art should understand that they can make various changes, substitutions and alterations herein without departing from the spirit and scope of the invention in its broadest form.

What is claimed is:

1. A packet switch capable of receiving fixed size data cells from N input ports and transmitting said fixed size data cells to N output ports, said packet switch comprising:

a frame deserializer capable of receiving said data cells as serial bits from said N input ports and transmitting said data cells as parallel bits in data frames containing a plurality of data cells, wherein each of said plurality of data cells in each data frame are destined for a common output port;

a frame serializer capable of receiving said data frames and transmitting said plurality of data cells in said data frames as serial bits to said N output ports; and a shared buffer coupling said frame deserializer and said frame serializer capable of receiving and buffering said data frames from said frame deserializer and transmitting said buffered data frames to said frame serializer.

2. The packet switch as set forth in claim 1 wherein each said data frame contains up to N data cells.

3. The packet switch as set forth in claim 2 wherein said frame deserializer transmits to said shared buffer fully filled data frames containing N data cells prior to transmitting partially filled data frames containing less than N data cells.

4. The packet switch as set forth in claim 3 wherein said frame deserializer first transmits to said shared buffer a first fully filled data frame having a highest priority among all fully filled data frames.

5. The packet switch as set forth in claim 4 wherein a priority of each of said fully filled data frames is determined by a priority of said common output port associated with each of said fully filled data frames.

6. The packet switch as set forth in claim 5 wherein a priority of a first common output port to which said first fully filled data frame is transmitted is updated after said first fully filled data frame has been transmitted.

7. The packet switch as set forth in claim 3 wherein said frame deserializer first transmits to said shared buffer a first partially filled data frame having a highest priority among all partially filled data frames.

8. The packet switch as set forth in claim 7 wherein a priority of each of said partially filled data frames is determined by a priority of said common output port associated with each of said partially filled data frames.

9. The packet switch as set forth in claim 8 wherein a priority of a first common output port to which a first of said partially filled data frames is transmitted is updated after said first partially filled data frame has been transmitted.

10. The packet switch as set forth in claim 1 wherein said frame deserializer comprises a frame assembly buffer comprising:
    N input buffers capable of receiving and buffering said data cells from said N input ports;
    N output buffers capable of receiving and storing said data cells transferred from said N input buffers; and
    an interconnection network capable transferring said data cells from each of said N input buffers to each of said output buffers.

11. The packet switch as set forth in claim 1 wherein said shared buffer comprises a plurality of shared buffer banks.

12. A communication network capable of transferring data in fixed-size packets between a plurality of end-user devices, said communication network comprising:
    a plurality of packet switches, each of said packet switches capable of receiving fixed size data cells from N input ports and transmitting said fixed size data cells to N output ports, said each packet switch comprising:
        a frame deserializer capable of receiving said data cells as serial bits from said N input ports and transmitting said data cells as parallel bits in data frames containing a plurality of data cells, wherein each of said plurality of data cells in each data frame are destined for a common output port;
        a frame serializer capable of receiving said data frames and transmitting said plurality of data cells in said data frames as serial bits to said N output ports; and
        a shared buffer coupling said frame deserializer and said frame serializer capable of receiving and buffering said data frames from said frame deserializer and transmitting said buffered data frames to said frame serializer.

13. The communication network as set forth in claim 12 wherein each said data frame contains up to N data cells.

14. The communication network as set forth in claim 13 wherein said frame deserializer transmits to said shared buffer fully filled data frames containing N data cells prior to transmitting partially filled data frames containing less than N data cells.

15. The communication network as set forth in claim 14 wherein said frame deserializer first transmits to said shared buffer a first fully filled data frame having a highest priority among all fully filled data frames.

16. The communication network as set forth in claim 15 wherein a priority of each of said fully filled data frames is determined by a priority of said common output port associated with each of said fully filled data frames.

17. The communication network as set forth in claim 16 wherein a priority of a first common output port to which said first fully filled data frame is transmitted is updated after said first fully filled data frame has been transmitted.

18. The communication network as set forth in claim 14 wherein said frame deserializer first transmits to said shared buffer a first partially filled data frame having a highest priority among all partially filled data frames.

19. The communication network as set forth in claim 18 wherein a priority of each of said partially filled data frames is determined by a priority of said common output port associated with each of said partially filled data frames.

20. The communication network as set forth in claim 19 wherein a priority of each of said partially filled data frames is determined by a priority of said common output port associated with each of said partially filled data frames.

21. The communication network as set forth in claim 12 wherein said frame deserializer comprises a frame assembly buffer comprising:
    N input buffers capable of receiving and buffering said data cells from said N input ports;
    N output buffers capable of receiving and storing said data cells transferred from said N input buffers; and
    an interconnection network capable transferring said data cells from each of said N input buffers to each of said output buffers.

22. The communication network as set forth in claim 12 wherein said shared buffer comprises a plurality of shared buffer banks.

23. A method of operating a packet switch capable of receiving fixed size data cells from N input ports and transmitting the fixed size data cells to N output ports, the method comprising the steps of:
    receiving the data cells in a frame deserializer as serial bits from the N input ports;
    transmitting the data cells to a shared buffer as parallel bits in data frames containing a plurality of data cells, wherein each of the plurality of data cells in each data frame are destined for a common output port;
    receiving and buffering in the shared buffer the data frames from the frame deserializer;
    transmitting the buffered data frames to a frame serializer; and
    receiving the data frames in the frame serializer and transmitting the plurality of data cells in the data frames as serial bits to the N output ports.

24. The method as set forth in claim 23 wherein each data frame contains up to N data cells.

25. The method as set forth in claim 24 wherein the step of transmitting the data cells to the shared buffer comprises the substep of transmitting to the shared buffer fully filled data frames containing N data cells prior to transmitting partially filled data frames containing less than N data cells.

26. The method as set forth in claim 25 further comprising the substep of first transmitting to the shared buffer a first fully filled data frame having a highest priority among all fully filled data frames.

27. The method as set forth in claim 26 wherein a priority of each of the fully filled data frames is determined by a priority of the common output port associated with each of the fully filled data frames.

28. The method as set forth in claim 27 wherein a priority of a first common output port to which the first fully filled data frame is transmitted is updated after the first fully filled data frame has been transmitted.

29. The method as set forth in claim 25 wherein the step of transmitting the data cells to the shared buffer comprises the substep of first transmitting to the shared buffer a first partially filled data frame having a highest priority among all partially filled data frames.

30. The method as set forth in claim 29 wherein a priority of each of the partially filled data frames is determined by a priority of the common output port associated with each of the partially filled data frames.

31. The method as set forth in claim 30 wherein a priority of a first common output port to which a first of the partially filled data frames is transmitted is updated after the first partially filled data frame has been transmitted.

* * * * *